C. E. QUINTIN.
COUPLING DEVICE FOR GREASE CUPS AND THE LIKE.
APPLICATION FILED JAN. 15, 1919.

1,304,601.

Patented May 27, 1919.

WITNESS

INVENTOR
Clarence E. Quintin
BY
ATTORNEY

UNITED STATES PATENT OFFICE.

CLARENCE E. QUINTIN, OF GLEN RIDDLE, PENNSYLVANIA, ASSIGNOR TO LEANDER W. RIDDLE, OF GLEN RIDDLE, PENNSYLVANIA.

COUPLING DEVICE FOR GREASE-CUPS AND THE LIKE.

1,304,601.

Specification of Letters Patent. Patented May 27, 1919.

Application filed January 15, 1919. Serial No. 271,183.

*To all whom it may concern:*

Be it known that I, CLARENCE E. QUINTIN, a citizen of the United States, residing at Glen Riddle, Delaware county, State of Pennsylvania, have invented certain new and useful Improvements in Coupling Devices for Grease-Cups and the like, of which the following is a full, clear, and exact description, reference being had to the accompanying drawings, forming a part of this specification.

My invention relates to coupling and locking devices for separable cups which consist of a cup body and a cap or closure therefor, and is of special value in connection with grease cups, cylinder and lubricator cups, and particularly when the cup element, as in grease cups, is made of glass, as is sometimes done, and the cap or closure of metal. My invention takes the place of the direct screw threaded connection between the cup and cap, or the wire locking bail, sometimes used in place of the threaded connection.

I have shown and described my invention as applied to a grease cup, of which the cup element may be made of glass, but in which the cup and cap elements may be metal as usual. Where the cup element is glass, closed by a metallic cap, the additional advantage of my device is manifest, while in both cases, the vibration to which such grease cups are subjected in use, tends to make the coupling and locking of the elements, by either of the usual means above referred to, unstable and insufficient.

My present invention is designed to remedy that defect, and to that end it consists in the combination with a cup body having an outwardly projecting and horizontally disposed annular flange on its open end or rim, and a closing cap formed with a vertically disposed annular flange on its outer edge, which is exteriorly threaded, of a metallic expansion and locking ring member which is shaped to provide two substantially parallel members, one of which is adapted to be brought to bear with pressure on the flange of the cup body and the other member of which is interiorly threaded to register with the exteriorly threaded upright flange on the closing cap; contact insulating means, such as leather, rubber or asbestos fiber, being preferably interposed, as washers, between the otherwise contacting parts of the cup body, especially when made of glass, and the metal of the closing cap.

Figure 1:
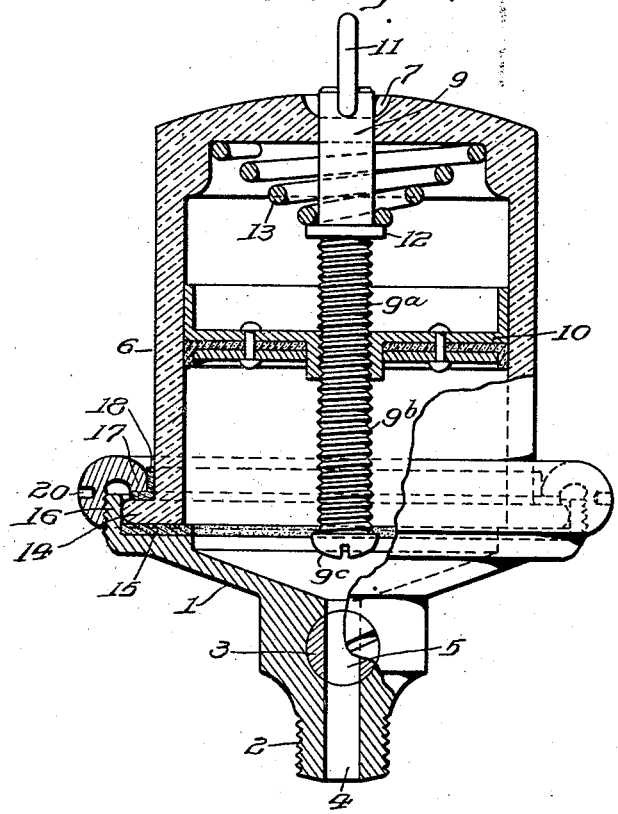

In the drawings illustrating my invention, Figure 1 is a vertical sectional view showing my invention as applied to a certain type of glass bodied grease cup, though equally applicable to other types in which the cup and cap have the coördinated flanges, or their equivalents, hereinbefore referred to.

Figure 2:
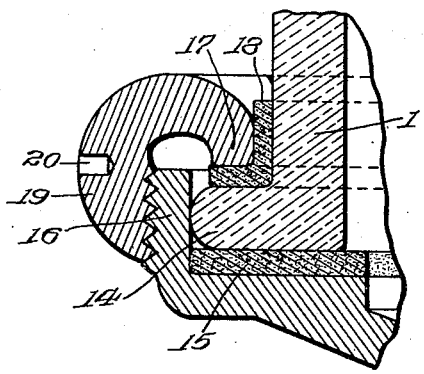

Fig. 2 is a detached view, in section, showing the elements of my improved coupling locking means, and their combined relation with the cup elements.

Referring to said drawings, there is shown in Fig. 1, the usual metallic closing cap 1, provided with the usual threaded nipple 2 for securing it upon a bearing by means of the threaded nipple entering a corresponding hole in the bearing; and, as usual, there is a regulating plug 3 in the nipple intersecting the passage 4, and having a central opening 5 adapted, when the plug is turned, to operate as a cock, by alining with said passage, and thereby regulating the feed or fully cutting off the same.

The cup body 6 is preferably made of glass, or of material having the transparency as well as rigidity of glass; it is shown as, and preferably is, a cylindrical body, in the form of an inverted cup, open at its basal end, which is provided with a horizontally-disposed annular flange 14, which is intended, preferably to rest upon an annular washer 15 of resilient material. The top wall of the cup body is centrally bored to admit the free passage of a stem or rod 9 carrying a plunger 10.

The free end of the plunger rod is shown provided with a semaphore or signal device in the form of a ring, which affords a convenient means for rotating the rod, to compress the spiral spring and set the device for discharging the cup contents. The bored opening in the top wall of the cup body is surrounded by an oval depression 7 which operates to prevent rotation of the plunger rod during feeding, as the ring can be turned to flat or feeding position and thus lie within the oval depression. The plunger rod is shown provided with a collar 12 whereon to seat one terminal of a compression spring 13, the other terminal of which bears against the interior upper wall of the cup body 6.

While I have thus described somewhat in detail the cup and cap elements shown in the drawings, they are no part of my present invention except in so far as they have coördinated flanges, one resting within the other, and hence at right angles to each other when in assembled relation, and with which my new coupling ring constructed as hereinafter described is adapted to co-act as an adjustable locking device when said first mentioned elements are brought into assembled relation as described.

The metallic closing cap is constructed as heretofore described and as in the prior art, except that I provide it with a vertically disposed annular flange 16 which is threaded exteriorly. Its outside diameter is such that the flanged cup rests within the flanged rim of the closing cap. The new coupling and locking device, whereby these elements are securely, but adjustably as well as detachably, coupled and locked together, consists of a metallic ring shaped to form two leg members which lie in substantially parallel vertical planes. It may be drawn or pressed to form a curved body, in cross section, as shown in Fig. 2 for ease of manufacture, and lessened cost, but that is not material, if it provides the two parallel operating members.

One of these leg members, indicated at 17, is adapted to directly rest upon an interposed annular washer 18, of similar material to washer 15, and be brought down to bear with pressure upon the flanged edge 14 of the glass cup body, by operation of the other and parallel leg member 19 which is threaded on its inner face to register with the exteriorly threaded flange 16 of the cap; and to effect the assembling of these elements more readily the leg member 19 of the locking ring may be recessed as at 20 for the insertion of a turning tool.

Having thus described my invention, I claim:

1. The combination with a cup body having a horizontally disposed annular flange and a cap therefor having a vertically-disposed and threaded rim flange, of means to detachably couple and lock the cap to the body, consisting of an annular ring shaped to provide two substantially parallel members one of which is threaded to register with said vertically disposed threaded flange on the closing cap and the other of which is adapted to be thereby brought to rest, with pressure, on said horizontally disposed flange on the cup body.

2. The combination of a cup body having an open end provided with a horizontally disposed annular flange, a closing cap having a vertically disposed and exteriorly threaded rim flange, the former adapted to rest within the latter, and a coupling ring consisting of two members one of which is adapted by threaded engagement with the threaded flange of the cap to force the other member of the locking ring into adjustably coupled relation to the flange of the cup body.

3. The combination with a cup body of glass having a horizontally disposed annular flange on its open end, a metallic closing cap therefor having a vertically disposed and exteriorly threaded rim flange, resilient washers interposed between adjacent parts of said elements when brought into assembled relation, and a detachable coupling device consisting of a ring shaped, in cross section, to form two substantially parallel members one of which is interiorly threaded to coact with the threaded cap flange and operating to bring the other member into coupled and locked relation to the flanged cup body.

In testimony whereof I have hereunto affixed my signature this eleventh day of January, A. D. 1919.

CLARENCE E. QUINTIN.

Witnesses:
I. M. TUNIS,
ALEXANDER PARK.

Copies of this patent may be obtained for five cents each, by addressing the "Commissioner of Patents, Washington, D. C."